United States Patent
Alemdaroglu et al.

(10) Patent No.: US 8,617,346 B2
(45) Date of Patent: Dec. 31, 2013

(54) PROCESS FOR COATING, ADHESIVE BONDING AND BINDING OF MINERAL SURFACES

(75) Inventors: Fikri Emrah Alemdaroglu, Stemshorn (DE); Christian Hagen, Lemfoerde (DE); Marcus Leberfinger, Georgsmarienhuette (DE)

(73) Assignee: BASF SE, Ludwigshafen (DE)

( * ) Notice: Subject to any disclaimer, the term of this patent is extended or adjusted under 35 U.S.C. 154(b) by 444 days.

(21) Appl. No.: 13/123,656

(22) PCT Filed: Oct. 14, 2009

(86) PCT No.: PCT/EP2009/063397
§ 371 (c)(1),
(2), (4) Date: Apr. 11, 2011

(87) PCT Pub. No.: WO2010/043644
PCT Pub. Date: Apr. 22, 2010

(65) Prior Publication Data
US 2011/0253308 A1    Oct. 20, 2011

(30) Foreign Application Priority Data
Oct. 17, 2008  (EP) .................................. 08166887

(51) Int. Cl.
C04B 37/00   (2006.01)
C09J 7/02    (2006.01)
B05D 5/10    (2006.01)

(52) U.S. Cl.
USPC ................. 156/325; 156/329; 427/207.1

(58) Field of Classification Search
USPC .................. 156/325, 329; 427/207.1
See application file for complete search history.

(56) References Cited

U.S. PATENT DOCUMENTS

| | | |
|---|---|---|
| 3,886,226 A | 5/1975 | Asai et al. |
| 2007/0287787 A1 | 12/2007 | Ferrand et al. |
| 2008/0213044 A1 | 9/2008 | Leberfinger et al. |
| 2009/0081368 A1 | 3/2009 | Roser et al. |
| 2010/0028542 A1 | 2/2010 | Reese et al. |
| 2010/0040894 A1 | 2/2010 | Rosenau et al. |

FOREIGN PATENT DOCUMENTS

| | | |
|---|---|---|
| DE | 10 2005 027 551 | 12/2006 |
| EP | 1 801 138 | 6/2007 |
| EP | 1 867 693 | 12/2007 |
| JP | 7 206982 | 8/1995 |
| JP | 7 304853 | 11/1995 |
| WO | 2006 134136 | 12/2006 |
| WO | 2006 134147 | 12/2006 |
| WO | 2007 104659 | 9/2007 |

OTHER PUBLICATIONS

International Search Report issued Mar. 31, 2010 in PCT/EP09/063397 filed Oct. 14, 2009.

*Primary Examiner* — Michael Orlando
(74) *Attorney, Agent, or Firm* — Oblon, Spivak, McClelland, Maier & Neustadt, L.L.P.

(57) ABSTRACT

A process for coating, for adhesive bonding or for binding of surfaces of mineral materials with a 2-component plastic resin, selected from a hydrophobic polyurethane resin and a hydrophobic epoxy resin, by applying the plastic resin to the surface or binding the surfaces of the mineral materials with the plastic resin and allowing the plastic resin to cure, wherein the plastic resin comprises from 0.01 to 10% by weight of one or more hydroxy- or alkoxyaminosilane compounds of the general formula (I)

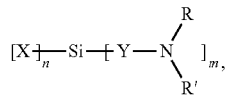

(I)

in which:
X independently of one another, are OH, $CH_3$, $O[CH_2]_p CH_3$;
Y is $[CH_2]_t$, $[CH_2]_r NH[CH_2]_s$;
R, R' are H, $[CH_2]_t CH_3$;
t is 0-10;
n is 1-3;
p is 0-5;
m is 4-n;
r, s independently of one another, are 1-10.

20 Claims, No Drawings

PROCESS FOR COATING, ADHESIVE BONDING AND BINDING OF MINERAL SURFACES

The invention relates to a process for coating, for adhesive bonding or for binding of surfaces of mineral materials with a plastic resin, preferably with a 2-component plastic resin.

The consolidation of banks, in particular of bank slopes, is frequently necessary for regulating flowing bodies of water. In the case of new construction and in particular in the case of renovation of waterways and levees, regions of the bank generally also have to be consolidated.

To date, composite bodies comprising ballast and high-quality concrete were prefabricated and positioned at the place of use, for the purpose of such renovations. In this process, however, renovation of damaged regions of the bank on site is not possible. Moreover, the components generally have a very high weight. A further disadvantage of concrete is its lack of elasticity and porosity. As a result of this, the concrete does not withstand stresses and these composites easily loosen.

One possibility for renovating damaged regions of the bank on site consist of the use of hardening tar formulations or liquid concretes or liquid mortars which were applied over the rock ballast of the bank slopes, which ballast is to be consolidated. With this process, consolidation of the bank slopes can be achieved for a certain time. However, there is in particular the ecological disadvantage that phenolic or other environmentally harmful compounds may be released from the tar in the course of time.

The use of polyurethanes for producing moldings with mineral ingredients and for consolidating rock layers, in particular in mining, is likewise known. In one embodiment of this process, moldings are produced by introducing rock, preferably ballast, into a mold and applying the liquid reaction mixture of the starting components of the polyurethane thereon. The moldings formed after curing can be positioned on the bank slope.

WO 2006/134136 describes a process in which, in a first step, the liquid starting components of a 2-component plastic are mixed with stones in a mixing apparatus and, in a second step, this mixture is applied to the bank section to be consolidated or to structures present at least partly in bodies of moving water, such as support and structural elements, or the mixture is introduced into a mold where the plastic cures. The plastic used is a compact hydrophobic polyurethane which is obtainable by reacting polyisocyanates with a polyol component, the polyol component comprising a polyol known from fat chemistry and a phenol-modified aromatic hydrocarbon resin, preferably a phenol-modified indene-coumarone resin.

A disadvantage of this process is that only certain types of stone which have a low surface tension and a low water absorption can be adhesively bonded. Examples are basalt or limestone. Types of stone which have a high surface tension and high water absorption, such as granite, cannot be adhesively bonded.

WO 2006/134147 describes a process in which banks, hillsides, slopes or structures are consolidated and secured by composites comprising an epoxy resin and loose mineral particles. Thus, in a first step, the liquid starting components of an epoxy resin can be mixed with mineral particles in a mixing apparatus and, in a second step, this mixture can be applied to the bank section to be consolidated or to structures present at least partly in bodies of moving water, such as support and structural elements. Furthermore, this WO teaches that the mixture of the epoxy resin with mineral particles is introduced into a mold and the epoxy resin is allowed to cure. The molding obtained is then mounted on the bank section to be consolidated or on the structures present at least partly in bodies of moving water, such as support and structural elements. Curing of the mixtures comprising resin and mineral particles under water is not described.

The outer walls of structures are subject to aging in the course of time. As a result of environmental influences, but also owing to damage, such as graffiti, the buildings become shabby in the course of time. Thus, dirt on sensitive substrates frequently has to be removed in the area of facade cleaning, monument care and restoration of natural stone. In the case of large areas, this is usually effected by means of water jets, but preferably by sandblasting. In order to prevent further rapid contamination of the surfaces from occurring, the surfaces can be sealed after blasting.

WO 2007/104659 describes a process in which the surface is first freed from dirt, preferably by means of water jets or in particular sand blasting, and a compact hydrophobic polyurethane based on aliphatic polyisocyanates is then applied to the surface. The hydrophobicity of the polyurethanes used is brought about by addition of hydroxyl-functional components known from fat chemistry to the polyol component of the polyurethane system. Preferably, said component also comprises a phenol-modified aromatic hydrocarbon resin, in particular an indene-coumarone resin. Furthermore, the polyurethane system requires a catalyst for curing, for example an amine catalyst or a metal catalyst, for example based on tin, zinc or bismuth.

A disadvantage of this process is that polyurethane resins based on aliphatic polyisocyanates have a low strength and mechanical stability.

It is an object of the invention to provide a process for coating, for adhesive bonding or for binding of surfaces of mineral materials with a plastic resin, preferably a 2-component plastic resin, selected from a hydrophobic polyurethane resin and a hydrophobic epoxy resin, by applying the plastic resin to the surface or binding the surfaces of the mineral materials with the plastic resin and allowing the plastic resin to cure, in which the complete curing of the plastic resin can also be effected under water. It is in particular an object to provide such a process which is suitable for all types of minerals, i.e. also for those having high surface tension and water absorption, such as, for example, granite.

The object is achieved by a process for coating, for adhesive bonding or for binding of surfaces of mineral materials with a 2-component plastic resin, selected from a hydrophobic polyurethane resin and a hydrophobic epoxy resin, by applying the plastic resin to the surface or binding the surfaces of the mineral materials with the plastic resin and allowing the plastic resin to cure, wherein the plastic resin comprises from 0.01 to 10% by weight of one or more hydroxy- or alkoxyaminosilane compounds of the general formula (I)

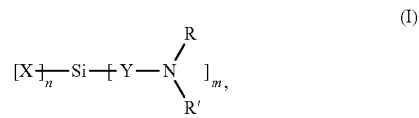
(I)

in which:
X independently of one another, are OH, $CH_3$, $O[CH_2]_p CH_3$;
Y is $[CH_2]_t$, $[CH_2]_r NH[CH_2]_s$;
R, R' are H, $[CH_2]_t CH_3$;
t is 0-10;
n is 1-3;

p is 0-5;

m is 4-n;

r, s independently of one another, are 1-10,

In general, the alkoxyaminosilane compound (I) is a trihydroxy-, dialkoxy- or trialkoxyaminosilane compound. Preferred alkoxy radicals X are methoxy and ethoxy. The amino group must be an amino group reactive with isocyanate groups, i.e. a primary or secondary amino group. Preferred alkyl radicals R are hydrogen, methyl and ethyl.

The alkoxyaminosilane compound (I) is preferably a trihydroxyaminosilane compound or a trialkoxyaminosilane compound, X=OH or $O[CH_2]_pCH_3$ and p being 0 or 1 in formula (I).

Furthermore, the alkoxyaminosilane compound (I) is preferably an alkoxydiaminosilane compound, Y being $[CH_2]_r$ $NH[CH_2]_s$ and r, s being identical or different and being 1 or 2 in formula (I). Examples are $[CH_2]_3NH[CH_2]_2$, $[CH_2]_2NH[CH_2]_2$, $[CH_2]NH[CH_2]$, $[CH_2]_3NH[CH_2]_3$, $[CH_2CH(CH_3)CH_2]NH[CH_2]_2$ and $[CH_2]_2NH[CH_2]_3$.

In particular, the alkoxyaminosilane compound (I) is a trialkoxydiaminosilane compound, $X=O[CH_2]_pCH_3$ where p is 0 or 1 and Y being $[CH_2]_rNH[CH_2]_s$ with r, s being identical or different and being 1 or 2 in formula (I).

Particularly preferred alkoxyaminosilane compounds (I) are 3-triethoxysilylpropylamine, N-(3-trihydroxysilylpropyl)ethylenediamine, N-(3-trimethoxysilylpropyl)ethylenediamine and N-(3-methyldimethoxymethylsilyl-2-methylpropyl)ethylenediamine.

The 2-component plastics are prepared from liquid starting components and cure to give solid plastics. Preferably, the plastics are compact, i.e. they comprise virtually no pores. Compared with cellular plastics, compact plastics are distinguished by greater mechanical stability. Bubbles within the plastic may occur and are generally not critical. However, they should as far as possible be minimized.

Furthermore, the plastics are hydrophobic. As a result, degradation of the plastics by the water is suppressed.

In an embodiment of the invention, the 2-component plastic resin is a polyurethane resin which is obtainable by mixing a polyisocyanate component (i) with a polyol component (ii). In general, the alkoxyaminosilane compound is present in the polyol component (ii).

The content of the alkoxyaminosilane compound (I) in the polyurethane resin is from 0.05 to 80% by weight, preferably from 0.075 to 10% by weight and in particular from 0.01 to 0.2% by weight.

In general, the alkoxyaminosilane compound (I) produces binding of the hydrophobic resin to the hydrophilic surface of the minerals. The binding to the mineral surface is brought about by silanol groups, which are formed by hydrolysis of the alkoxyaminosilanes. The binding to the resin is brought about by the reactive amino group of the alkoxyaminosilane.

Synthesis components of the polyurethanes are compounds having free isocyanate groups (polyisocyanates (i)) and compounds having groups which are reactive with isocyanate groups. The latter are also referred to below as polyol component (ii). Groups which are reactive with isocyanate groups are in particular hydroxyl groups or amino groups. Hydroxyl groups are preferred since the amino groups are very reactive and the reaction mixture therefore has to be rapidly processed.

Polyisocyanates (i) which may be used are all those polyisocyanates, mixtures and prepolymers having at least two isocyanate groups which are liquid at room temperature. In an embodiment of the invention, aromatic polyisocyanates are used, particularly preferably isomers of toluene diisocyanate (TDI) and of diphenylmethane diisocyanate (MDI), in particular mixtures of MDI and polyphenylenepolymethylene polyisocyanates (crude MDI). The polyisocyanates may also be modified, for example by the incorporation of isocyanurate groups and in particular by the incorporation of urethane groups. The last-mentioned compounds are prepared by reacting polyisocyanates with less than the stoichiometric amount of compounds having at least two active hydrogen atoms and are usually referred to as NCO prepolymers. Their NCO content is in general in the range from 2 to 29% by weight.

In a further embodiment, aliphatic polyisocyanates are used. Preferred aliphatic polyisocyanates are hexamethylene diisocyanate (HDI) and isophorone diisocyanate (IPDI). Owing to the high volatility of the aliphatic polyisocyanates, they are generally used in the form of their reaction products, in particular as biurets, allophanates or isocyanurates.

The polyol component (ii) comprises very generally compounds having at least two hydrogen atoms reactive with isocyanate groups. These are polyfunctional alcohols (polyols) or—less preferably—polyfunctional amines.

In the process according to the invention, compact polyurethanes used are those having a hydrophobic finish. The hydrophobicity can be achieved in particular by hydroxyl-functional components known from a fat chemistry in the polyol component (ii).

In a preferred embodiment, the polyol component (ii) of the polyurethane therefore comprises one or more polyols known from fat chemistry. Such polyols known from fat chemistry are obtainable from animal or vegetable fats and oils.

There are a number of known hydroxyl-functional components which are known from fat chemistry and can be used as polyols known from fat chemistry. Examples are castor oil, oils modified with hydroxyl groups, such as grapeseed oil, black cummin oil, pumpkin seed oil, borage seed oil, soybean oil, wheat germ oil, rapeseed oil, sunflower oil, peanut oil, apricot seed oil, pistachio nut oil, almond oil, olive oil, macadamia nut oil, avocado oil, sea buckthorn oil, sesame oil, hazelnut oil, evening primrose oil, wild rose oil, hemp oil, safflower oil, walnut oil, fatty acid esters modified with hydroxyl groups and based on myristoleic acid, palmitoleic acid, oleic acid, vaccenic acid, petroselinic acid, gadoleic acid, erucic acid, nervonic acid, linoleic acid, linolenic acid, stearidonic acid, arachidonic acid, timnodonic acid, clupanodonic acid and cervonic acid. Castor oil and its reaction products with alkylene oxides or ketone-formaldehyde resins are preferably used here. Last-mentioned compounds are sold, for example, by Bayer AG under the name Desmophen® 1150.

A further preferably used group of polyols known from fat chemistry can be obtained by ring opening of epoxidized fatty acid esters with simultaneous reaction with alcohols and, if appropriate, subsequent further transesterification reactions. The incorporation of hydroxyl groups into oils and fats is effected in the main by epoxidation of the olefinic double bond present in these products, followed by reaction of the resulting epoxide groups with a monohydric or polyhydric alcohol. The epoxide ring is converted thereby into a hydroxyl group or, in the case of polyfunctional alcohols, into a structure having a larger number of OH groups. Since oils and fats are generally glyceryl esters, parallel transesterification reactions also take place during the abovementioned reactions. The compounds thus obtained preferably have a molecular weight in the range from 500 to 1500 g/mol. Such products are available, for example, from Henkel.

The polyol component preferably comprises at least 50% by weight, in particular at least 75% by weight, of the polyols known from fat chemistry.

In a particularly preferred embodiment, the polyol component (ii) also comprises, in addition to the polyol known from fat chemistry, at least one phenol-modified aromatic hydrocarbon resin, in particular an indene-coumarone resin. These polyurethanes and their synthesis components have a very high hydrophobicity.

Preferably used phenol-modified aromatic hydrocarbon resins having a terminal phenol group are phenol-modified indene-coumarone resins, particularly preferably industrial mixtures of aromatic hydrocarbon resins, in particular those which comprise, as a substantial constituent, compounds of the general formula (II)

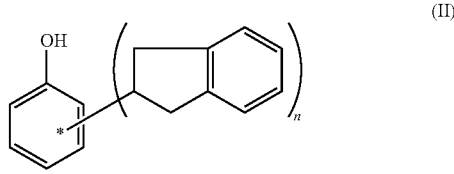

(II)

where n is from 2 to 28. Such products are commercially available and are offered, for example, by Rütgers VFT AG under the tradename NOVARES®.

The phenol-modified aromatic hydrocarbon resins, in particular the phenol-modified indene-coumarone resins, generally have an OH content of from 0.5 to 5.0% by weight.

The polyol known from fat chemistry and the phenol-modified aromatic hydrocarbon resin, in particular the indene-coumarone resin, are preferably used in a weight ratio of from 100:1 to 100:50.

The polyol component (ii) preferably comprises altogether at least 55% by weight, in particular at least 80% by weight of polyols known from fat chemistry and of the phenol-modified aromatic hydrocarbon resins.

Together with said compounds, the polyol component (ii) may comprise further compounds having at least two active hydrogen atoms. Owing to their high stability to hydrolysis, polyether alcohols are preferred. These are prepared by customary and known processes, generally by an addition reaction of alkylene oxides with H-functional initiators. The concomitantly used polyether alcohols preferably have a functionality of at least 3 and a hydroxyl number of at least 400 mg KOH/g, preferably at least 600 mg KOH/g, in particular in the range from 400 to 1000 mg KOH/g. Their preparation is effected by a customary route by reacting at least trifunctional initiators with alkylene oxides. Alcohols having at least three hydroxyl groups in the molecule can preferably be used as initiators, for example glycerol, trimethylol propane, pentaerythritol, sorbitol or sucrose. The alkylene oxide used is preferably propylene oxide.

The polyisocyanate component (i) and the polyol component (ii) may comprise further customary constituents, for example catalysts and customary assistants and additives. In particular, drying agents, for example zeolites, should be added to the reaction mixture in order to avoid the enrichment of water in the components and hence foaming of the polyurethanes. The addition of these substances is preferably effected to the polyol component (ii). For improving the long-term stability of the composites, it is furthermore advantageous to add compositions for preventing attack by microbes. Moreover, the addition of UV stabilizers or pigments is advantageous for avoiding embrittlement of the moldings.

The polyurethanes used can in principle be prepared without the presence of catalysts. Catalysts may be concomitantly used for improving the curing. Catalysts chosen should preferably be those which result in as long a reaction time as possible. As a result, it is possible for the reaction mixture to remain liquid for a long time. As described, it is also possible in principle to work entirely without a catalyst.

The polyisocyanate component (i) is reacted with the polyol component (ii) in general in a ratio such that the stoichiometric excess of isocyanate groups over those groups of the polyol component which are reactive with isocyanate groups is at least 5%, preferably from 5 to 60%.

The hydrophobic polyurethanes are distinguished by particularly good processability. Thus, these polyurethanes show particularly good adhesion, in particular to moist substrates, such as wet rock, in particular granite ballast. The polyurethanes cure to give virtually compact products in spite of the presence of water. The compact polyurethanes used exhibit completely compact curing even in thin layers.

The polyurethanes, preferably based on the abovementioned aromatic polyisocyanates, are therefore outstandingly suitable for consolidating bank slopes, in particular dams and levees. The bond between rock and polyurethane is very strong. Furthermore, particularly with the use of very hydrophobic polyurethanes, there is virtually no hydrolytic degradation of the polyurethanes and hence very long durability of the bank slopes consolidated by the process according to the invention.

Polyurethanes used for coating surfaces are preferably compact and transparent, in order to avoid visual impairment of the surfaces, in particular in the case of facades of buildings. For the same reason, polyurethanes based on an aliphatic polyisocyanate are preferably used for this purpose since, in contrast to polyurethanes based on aromatic polyisocyanates, these do not yellow in the course of time.

In a further embodiment of the invention, the 2-component plastic resin is an epoxy resin which is obtainable by mixing a hydrophobic component (i) comprising epoxy groups and a curing component (ii). In generally, the alkoxyaminosilane compound is present in the curing component (ii).

The content of the alkoxyaminosilane compound (I) in the epoxy resin is from 0.05 to 10% by weight, preferably from 0.075 to 1% by weight and in particular form 0.1 to 0.5% by weight.

Preferably used compounds comprising epoxy groups are compounds which have at least two epoxy groups and are liquid at room temperature. It is also possible to use mixtures of different compounds comprising epoxy groups. Preferably, these compounds are hydrophobic or the mixtures comprise at least one compound comprising epoxy groups which is hydrophobic. Such hydrophobic compounds are obtained, for example, by a condensation reaction of bisphenol A or bisphenol F with epichlorohydrin. These compounds can be used individually or as mixtures.

In an embodiment, mixtures of abovementioned hydrophobic compounds containing epoxy groups with self-emulsifiable hydrophilic compounds comprising epoxy groups are used. These hydrophilic compounds are obtained by introducing hydrophilic groups into the main chain of the compound comprising epoxy groups. Such compounds and processes for their preparation are disclosed, for example, in JP-A-7-206982 and JP-A-7-304853.

Compounds which catalyze the homopolymerization of the compounds comprising epoxy groups or which undergo a covalent reaction with the epoxide groups or the secondary hydroxyl groups, such as polyamines, polyaminoamides, ketimines, carboxylic anhydrides and melamine-formaldehyde, urea-formaldehyde and phenol-formaldehyde adducts, serve as curing agents. Ketimines, obtainable by reacting a compound having primary or secondary amino groups, such as diethylenetriamine, triethylenetetramine, propylenediamine or xylylenediamine, with a carbonyl compound, such as acetone, methyl ethyl ketone or isobutyl methyl ketone, aliphatic, alicyclic and aromatic polyamine compounds and polyamide compounds are preferably used. Ketimines or compatible mixtures comprising ketimines are particularly preferably used as curing agents.

The ratio of reactive groups in the curing agent to epoxy groups is preferably from 0.7:1 to 1.5:1, particularly preferably from 1.1:1 to 1.4:1.

Moreover, even further additives, such as solvents, reactive diluents, fillers and pigments, may be added during the preparation of the epoxy resins, in addition to the compounds comprising epoxy groups and the curing agents used. Such additives are known to the person skilled in the art.

Some preferred fields of use of the process according to the invention are described below.

By means of the process according to the invention, loose mineral particles, such as stones, can be bound to give a composite. The liquid plastic or the liquid starting components of the 2-component plastic can be mixed with stones and, in a second step, this mixture can be applied to a bank section to be consolidated or to structures present at least partly in bodies of moving water, such as support and structural elements, or the mixture can be introduced into a mold and the plastic can then cure.

The composite comprising the plastic and the loose stones can be produced by
a) mixing the loose stones with the liquid starting components of the plastic in a mixer,
b) discharging this mixture from the mixer,
c) curing the plastic.

The loose stones are preferably ballast, particularly preferably granite ballast. The stones have a size of from 1 to 50 cm, preferably from 1 to 20 cm, particularly preferably from 2 to 15 cm, in particular from 2.5 to 6.5 cm.

Mixers which may be used for mixing the loose stones with the starting components of the plastic are in principle all types of mixers with which substantially complete wetting of the stones with the liquid starting components of the plastic is possible. Mixers which consist of an open container, for example a drum, which is preferably provided with internals, have proven particularly suitable. For mixing, either the drum can be caused to rotate or the internals can be moved.

Such mixers are known and are used, for example, in the construction industry for the production of concrete mixes.

In an embodiment of the process according to the invention, the mixing of the stones with the liquid starting components of the plastic is effected continuously. For this purpose, the stones and the liquid starting components of the plastic are introduced continuously into the mixer and the wetted stones are discharged continuously. In this procedure, it must be ensured that the starting materials remain in the mixer until sufficient wetting of the stones can take place. Expediently, such a mixing apparatus can be moved along the sections to be consolidated at a speed such that the stones wetted with the liquid starting components of the plastic are discharged from the mixer in the amount required for consolidation. It is also possible to operate the continuous mixing device in a stationary manner and to transport the wetted stones discharged from the mixer to the desired location.

In a further embodiment of the continuous configuration of the process according to the invention, the mixer may be a rotating drum into which stones are continuously introduced. This drum is equipped with nozzles which distribute the starting components of the plastic continuously onto the stones. Here, the rotation of the drum ensures thorough mixing of the plastic and stones. Plastic/stone composites are then discharged continuously through an opening at the end of the drum. The rotating drum may be horizontal or inclined at various angles in order to transport the discharge.

In a further embodiment of the continuous process, the stones are transported continuously on a conveyor belt which is driven through a tunnel. This has openings via which the starting materials of the plastic are discharged continuously onto the stones. At the end of the conveyor belt, the stones then fall into an open mixing drum which discharges the composite at an adjustable transport speed.

The thickness of the layer comprising the composite is preferably at least 10 cm since, in the case of smaller thicknesses, the mechanical stability is frequently not sufficient. The maximum thickness is dependent on the local circumstances and may be, for example, up to 5 meters.

In the production of moldings, the mixture of the loose stones with the liquid starting components of the plastic are introduced, after mixing, into a mold which is preferably open at the top and where the plastic cures. The composite bodies thus formed can be applied to the bank.

The time for the mixing should be at least such that the stones are wetted as completely as possible with the liquid mixture and at most so long that the plastic has not yet cured.

It is also possible to use stones which have loosely adhering impurities on their surface. As a result of the mechanical stress during the mixing process, these impurities are removed from the surface of the stones and can therefore no longer adversely affect the adhesion of the stones to one another.

In a preferred embodiment of the process according to the invention, sand can be applied to the surface of the molding. In order for the sand to adhere to the surface, the application of the sand should be effected before the complete curing of the plastic. Any desired sands may be used. Said sand may be natural sand or synthetic sand, such as granulated slag or crushed slag sand. In a preferred embodiment, quartz sand is used.

The rough surface caused by the sand promotes the settling of life forms, such as plants and mosses, on the applied moldings. This may be advantageous, for example, when the moldings are applied in nature conservancy areas.

The ratio of plastic to stone is chosen at least so that sufficient strength of the composite is ensured. The exact amounts also depend, for example, on the size with the mineral materials and the thickness of and stress on the moldings in the respective bank sections.

A further potential use of the process according to the invention is the protection of structures which are present at least partly in moving water from so-called subsurface erosion. This is understood as meaning local deepening of the flowing bodies of water, in particular of the river bed, generally where there is a strong water current in narrow stretches, frequently also at bridge supports, where the foundations are attacked owing to the back-up and the subsequent sharper gradient due to rotational flow, the so-called countercurrent. The same effect is found, for example, in the case of supports or bridge supports of piers, water bridges and/or floating bridges, harbor installations, such as floating, fixed jetties, landing stages or dry docks, in the case of quay installations, boat houses, bank walls, drilling platforms, off-shore installations, such as wind energy installations, marine navigation aids, lighthouses or measuring platforms, hydroelectric power stations, tunnels or pile systems.

As a result of the open gap system of the composite bodies which can absorb the hydrodynamic energy, thus breaks the wave energy or flow energy and consequently leads to substantially less subsurface erosion, damage to structures can be avoided and the load capacity of support and structural elements can be increased.

The mineral material may be walls of structures which are superficially cleaned in a first step and coated with the 2-component plastic in a second step.

The surface is preferably first freed from dirt by water jets or in particular sand blasting and the inventive hydrophobic polyurethane or epoxy resin is then applied to the surface.

A transparent, compact hydrophobic polyurethane based on an aliphatic polyisocyanate is preferably used.

The application of the polyurethane to the surface can be effected in a customary and known manner, preferably by spraying on. The thickness of the polyurethane layer is preferably from 0.5 mm to 1 cm, in particular from 0.5 cm to 3 mm.

The resins according to the invention are distinguished by better wetting and better adhesion to the mineral surfaces. In particular, surfaces of materials having a high surface tension, such as granite, are also wetted. The resins are insensitive to moisture on the mineral surfaces. Furthermore, the presence of an additional catalyst is not absolutely essential for curing.

The mineral materials may be parts of structures, dams and levees, and cracks and cavities present in these parts can be filled with the 2-component plastic resins.

For example, the process according to the invention can be used for stabilizing dams and levees, cracks or cavities present in the dams and levees being filled with a hydrophobic polyurethane.

The hydrophobic polyurethane can preferably be a compact polyurethane. However, it is also possible to use a hydrophobic polyurethane foam having a density in the range from 200 to 1000 kg/m$^3$. In the case of a higher density, the mechanical stability of the foams is frequently no longer ensured.

Aliphatic isocyanates, for example hexamethylene diisocyanate (HDI), isophorone diisocyanate (IPDI) or the reaction products thereof with themselves, for example with incorporation of uretdione or isocyanurate groups, can be used as polyisocyanate component (i). However, aromatic polyisocyanates are preferably used, particularly preferably isomers of toluene diisocyanate (TDI) and of diphenylmethane diisocyanate (MDI), in particular mixtures of MDI and polyphenylenepolymethylene polyisocyanates (crude MDI). The polyisocyanates may also be modified, for example by incorporation of isocyanurate groups and in particular by incorporation of urethane groups. The last-mentioned compounds are prepared by reacting polyisocyanates with less than the stoichiometric amount of compounds having at least two active hydrogen atoms and are usually referred to as NCO prepolymers. Their NCO content is in general in the range from 2 to 29% by weight.

For the renovation of damaged dams and levees, the liquid starting components of the polyurethanes, i.e. the polyisocyanate component (i) and the polyol component (ii), are applied where a damaged area is present, where they cure to give polyurethane.

In the case of damage to the surface, the liquid starting components of the polyurethanes are applied manually, via a mixing head or by means of a spray gun, depending on the amount required. For filling cavities in the interior of the dams or levees, the liquid starting components of the polyurethanes can be introduced into the interior of the levees, for example, by means of a mixing head and a lance.

The invention is explained in more detail by the following examples.

EXAMPLES

Polyol: hydroxyl-functional component known from fat chemistry and based on castor oil, reaction products of castor oil with a ketone-formaldehyde resin, OH number 170

Isocyanate: polymeric diisocyanatodiphenylmethane (PMDI)

Additive 1: silicone antifoam

Additive 2: N-(3-(trimethoxysilyl)propyl)ethylenediamine

Comparative Example 93 parts by weight of polyol, 6.95 parts by weight of a zeolite drying agent, 50% strength in castor oil, and 0.05 part by weight of an additive 1 were mixed to give a polyol component. 83.7 parts by weight of isocyanate were added to this prepared polyol component, and the components were thoroughly mixed. A 2 mm sheet was produced from the mixture of the components in order to analyze Shore-D, elongation at break, tensile strength and glass transition temperature Tg. Moreover, composite bodies were produced from the polyurethane resin with basalt ballast. For this purpose, basalt ballast was introduced into an open mold having the dimensions 15 cm×15 cm×15 cm. The liquid mixture of the components was distributed uniformly over the basalt ballast by means of a watering can. The liquid reaction mixture having a very long reaction time wetted the rock and impregnated the entire ballast site. The compact polyurethane cured without bubbles and gave a strong bond to the granite ballast. The results of the measurements are summarized in the table.

Example

According to the Invention 93 parts by weight of polyol, 6.85 parts by weight of a zeolite drying agent, 50% strength in castor oil, and 0.05 part by weight of an additive 1 were mixed to give a polyol component. 0.1 part by weight of additive 2 was added to this mixture and the polyol component was thus complete. 83.7 parts by weight of isocyanate were added to this prepared polyol component, and the components were thoroughly mixed. A 2 mm sheet was produced from the mixture of the components in order to analyze the Shore-D, elongation at break, tensile strength and glass transition temperature Tg. Moreover, composite bodies were produced from the polyurethane resin with basalt ballast. For this purpose, basalt ballast was introduced into an open mold having the dimensions 15 cm×15 cm×15 m. The liquid mixture of the components was distributed uniformly over the basalt ballast by means of a watering can. The liquid reaction mixture having a very long reaction time wetted the rock and impregnated the entire ballast site. The compact polyurethane cured without bubbles and gave a strong bond to the granite ballast. The results of the measurements are summarized in the table.

| Properties | System Standard system according to comparative example | System Example (according to the invention) |
|---|---|---|
| Shore-D hardness according to DIN 53505 | 70 | 66 |
| Elongation at break according to DIN 53504 | 70% | 70% |
| Tensile strength according to DIN 53504 | 22 MPa | 22 MPa |
| Tg/max. G" according to ISO 6721-2 | 35° C. | 35° C. |
| Curing time[1] | 37 minutes | 26 minutes |

| | Granite | Basalt | Granite | Basalt |
|---|---|---|---|---|
| Wetting | | | | |
| Dry curing | complete | complete | complete | complete |
| Underwater curing | about 10% | about 85% | complete | complete |
| Compressive strength[2] | | | | |
| Underwater curing | 5980N | 11102N | 12695N | 23793N |

[1] Achievement of a viscosity of 20 000 mPas at a temperature of 25° C., measured using a Haake VT 500 viscometer with measuring cup according to MV DIN B and rotor according to MV DIN 53019/ISO 3219
[2] Test conditions for pressure characteristic test: preload 5N, test speed 50 mm/min, load cut-out threshold 1000N

We claim:

1. A process for coating of at least one surface, or for adhesive bonding or for binding of surfaces of at least one mineral material with a 2-component plastic resin, the process comprising:
applying the 2-component plastic resin to the at least one surface or binding the surfaces of the at least one mineral material with the plastic resin; and
allowing the plastic resin to cure,
wherein the 2-component plastic resin comprises from 0.01 to 10% by weight of at least one hydroxy- or alkoxyaminosilane compound of formula (I)

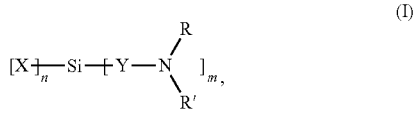

(I)

wherein:
X independently of one another, are OH, CH$_3$, O[CH$_2$]$_p$CH$_3$;
Y is [CH$_2$]$_t$, [CH$_2$]$_r$NH[CH$_2$]$_s$;
R and R' are H, [CH$_2$]$_t$CH$_3$;
t is 0-10;
n is 1-3;
p is 0-5;
m is 4-n; and
r and s independently of one another, are 1-10,
wherein the 2-component plastic resin is a hydrophobic polyurethane resin which is obtained by mixing a polyisocyanate component (i) with a polyol component (ii), wherein the polyol component (ii) comprises one or more polyols which are known from fat chemistry and obtained from at least one selected from the group consisting of an animal fat, an animal oil, a vegetable oil, and a vegetable fat, and the alkoxyaminosilane compound is comprised in the polyol component (ii).

2. The process of claim 1, wherein the alkoxyaminosilane compound (I) is a trihydroxyaminosilane compound or trialkoxyaminosilane compound, wherein X=OH or O[CH$_2$]$_p$CH$_3$ and p is 0 or 1 in formula (I).

3. The process of claim 1, wherein the alkoxyaminosilane compound (I) is an alkoxydiaminosilane compound, wherein Y is [CH$_2$]$_r$NH[CH$_2$]$_s$ and r and s are identical or different and being 1 or 2 in formula (I).

4. The process of claim 1, wherein the polyol component (ii) further comprises a phenol-modified aromatic hydrocarbon resin.

5. The process according to claim 1, wherein the plastic resin cures under water.

6. The process according to claim 1, wherein the at least one mineral material is loose stones, which are adhesively bonded to give a composite.

7. The process according to claim 1, wherein the at least one mineral material is at least one wall of a structure which is first superficially cleaned, and then coated with the 2-component plastic.

8. The process according to claim 1, wherein the at least one mineral material is at least one part of a structure, dam or levee, wherein at least one crack or cavity is present in the part is filled with the 2-component plastic resin.

9. The process of claim 1, wherein the alkoxyaminosilane compound (I) is the trihydroxyaminosilane compound, wherein X=OH in formula (I).

10. The process of claim 1, wherein the alkoxyaminosilane compound (I) is the trialkoxyaminosilane compound, wherein X=OCH$_2$CH$_3$ in formula (I).

11. The process of claim 1, wherein the alkoxyaminosilane compound (I) is the trialkoxyaminosilane compound, wherein X=OCH$_3$ in formula (I).

12. The process of claim 1, wherein the alkoxyaminosilane compound (I) is an alkoxydiaminosilane compound, wherein Y is [CH$_2$]$_2$NH[CH$_2$]$_2$ in formula (I).

13. The process of claim 1, wherein the alkoxyaminosilane compound (I) is an alkoxydiaminosilane compound, wherein Y is [CH$_2$]$_1$NH[CH$_2$]$_1$ in formula (I).

14. The process of claim 1, wherein the alkoxyaminosilane compound (I) is an alkoxydiaminosilane compound, wherein Y is [CH$_2$]$_2$NH[CH$_2$]$_1$ in formula (I).

15. The process of claim 1, wherein the alkoxyaminosilane compound (I) is an alkoxydiaminosilane compound, wherein Y is [CH$_2$]$_1$NH[CH$_2$]$_2$ in formula (I).

16. The process of claim 2, wherein the alkoxyaminosilane compound (I) is an alkoxydiaminosilane compound, wherein Y is [CH$_2$]$_r$NH[CH$_2$]$_s$ and r and s are identical or different and are 1 or 2 in formula (I).

17. The process of claim 9, wherein the alkoxyaminosilane compound (I) is an alkoxydiaminosilane compound, wherein Y is [CH$_2$]$_r$NH[CH$_2$]$_s$ and r and s are identical or different and are 1 or 2 in formula (I).

18. The process of claim 10, wherein the alkoxyaminosilane compound (I) is an alkoxydiaminosilane compound, wherein Y is [CH$_2$]$_r$NH[CH$_2$]$_s$ and r and s are identical or different and are 1 or 2 in formula (I).

19. The process of claim 11, wherein the alkoxyaminosilane compound (I) is an alkoxydiaminosilane compound, wherein Y is [CH$_2$]$_r$NH[CH$_2$]$_s$ and r and s are identical or different and are 1 or 2 in formula (I).

20. The process according to of claim 2, wherein the plastic resin cures under water.

* * * * *